Patented Dec. 24, 1940

2,226,174

UNITED STATES PATENT OFFICE 2,226,174

AZO COMPOUNDS AND MATERIAL COLORED THEREWITH

James G. McNally and Joseph B. Dickey, Rochester, N. Y., assignors to Eastman Kodak Company, Rochester, N. Y., a corporation of New Jersey No Drawing. Application August 12, 1939,
Serial No. 289,918

12 Claims. (Cl. 260—152)

This invention relates to the art of dyeing or coloring. More particularly, it relates to new azo compounds and the application of the nuclear non-sulfonated azo compounds for the coloration of organic derivatives of cellulose, particularly textile materials made of or containing an organic derivative of cellulose, by dyeing, printing, stenciling or like methods.

Organic derivatives of cellulose are characterized by an indifferent affinity for the usual cotton and wool dyes especially the ordinary water soluble dyes. Because of this, it has been necessary to develop new dye compounds suitable for the dyeing or coloration of materials, such as textile materials, made of or containing an organic derivative of cellulose. It is, accordingly, an object of our invention to provide a new class of azo dyes suitable for the dyeing or coloration of organic derivatives of cellulose. Another object is to provide a process for the coloration of organic derivatives of cellulose in which the dye or dyes are applied directly from an aqueous suspension to the material undergoing coloration. A further object is to produce dyeings on organic derivatives of cellulose which are of good fastness to light and washing. Other objects will hereinafter appear.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose, or benzyl cellulose. While our invention will be illustrated more particularly in connection with the coloration of cellulose acetate, a material to which the invention is especially adapted, it will be understood that it applies to the coloration of other organic derivatives of cellulose such as those just mentioned.

The azo compounds of our invention have the general formula: R—N=N—R₁ wherein R represents the residue of a member selected from the group consisting of an aryl nucleus of the benzene series and a benzothiazole nucleus, R₁ represents the residue of a member selected from the group consisting of an aryl nucleus of the benzene series containing but one benzene ring and an aryl nucleus of the naphthalene series and wherein the nucleus R₁ contains in para position to the azo bond a nitrogen atom which has attached thereto a lactone group. Compounds wherein R and R₁ are aryl nuclei of the benzene series have been found to be advantageous. Compounds wherein the aryl nucleus R contains a nitro group in para position to the azo bond and R₁ is the residue of an aryl nucleus of the benzene series have been found to be particularly advantageous.

The azo dye compounds of our invention can be prepared by diazotizing an amine having the general formula RNH₂, wherein R has the meaning previously assigned to it, and coupling the diazonium compound obtained with an aryl nucleus of the benzene or naphthalene series containing a nitrogen atom having a lactone group attached thereto and which is adapted to couple in para position to said nitrogen atom. The coupling components employed in the preparation of the azo compounds of our invention are, for the most part, represented by the general formula:

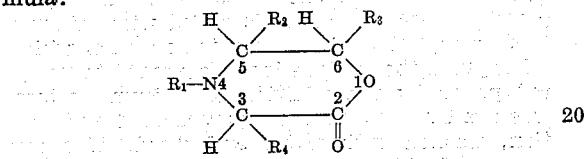

wherein R₁ represents the residue of a member selected from the group consisting of an aryl nucleus of the benzene series containing but one benzene ring and an aryl nucleus of the naphthalene series and wherein R₂, R₃ and R₄ each represents hydrogen, an alkyl group, an aryl nucleus of the benzene series, a cycloalkyl group or an allyl group. From the foregoing it will be seen that the coupling components employed in the preparation of the azo dye compounds of our invention are phenyl-morpholone-(2) and α-naphthyl-morpholone compounds.

The term "alkyl" as used herein and in the claims, unless otherwise indicated, includes not only unsubstituted alkyl groups such as a methyl group, an ethyl group, a propyl group or a butyl group but also substituted alkyl groups such as β-hydroxyethyl, β,γ-hydroxypropyl, β-methoxyethyl, β-ethoxyethyl or β'-methoxy-β-ethoxyethyl, for example. When R₂, R₃ or R₄ is an aryl nucleus of the benzene series, it will be understood that the benzene nucleus can be either substituted or unsubstituted. The benzene nucleus can, for example, be substituted with a halogen atom, an alkyl group, a nitro group, a carboxylic acid group, an alkoxy group or a cyano group, for example. Illustrative cycloalkyl groups include, for example, cyclobutyl and cyclohexyl.

As previously indicated, the nuclear non-sulfonated azo compounds of our invention constitute valuable dyes for the coloration of organic derivatives of cellulose such as those hereinbefore mentioned yielding various shades thereon of good fastness to light and washing. Compounds containing a nuclear sulfonic acid grouping in either of the nuclei R and R₁ possess little or no utility for the coloration of organic derivatives of cellulose but possess application for the coloration of textile materials such as wool and silk yielding generally similar shades thereon as the corresponding non-sulfonated compounds yield on organic derivatives of cellulose. These compounds can be prepared by sulfonation of the non-sulfonated compounds in accordance with known methods or by the use of previously sulfonated components.

The following examples illustrate the preparation of the azo compounds of our invention:

*Example 1*

13.5 grams of p-aminoacetophenone are dissolved in a mixture of 150 cc. of water and 25 cc. of 36% hydrochloric acid. The resulting solution is cooled to a temperature of 0–5° C. and diazotized while maintaining this temperature by adding, with stirring, 6.9 grams of sodium nitrite dissolved in water.

17.7 grams of

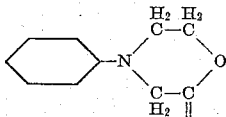

are dissolved in a mixture of 100 cc. of water and 10 cc. of 36% hydrochloric acid. The resulting solution is cooled to a temperature of 0–10° C. following which the diazonium solution prepared as described above is added with stirring. Upon completion of the coupling reaction which takes place, the mixture is made neutral to Congo red paper by the addition of sodium acetate. The dye compound formed is recovered by filtration, washed with water and dried. The dye compound obtained colors cellulose acetate silk an orange shade.

*Example 2*

13.8 grams of p-nitroaniline are diazotized in known fashion and the diazonium compound obtained is coupled with 19.1 grams of

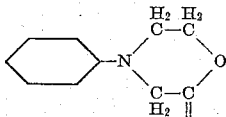

Coupling and recovery of the dye compound formed may be carried out as described in Example 1. The dye compound obtained colors cellulose acetate silk a red shade.

An equivalent gram molecular weight of

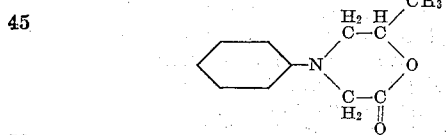

and

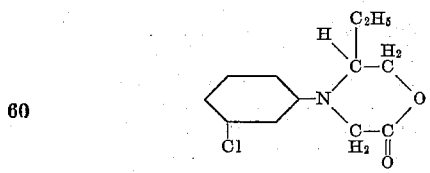

for example, can be substituted for the coupling component of the example to obtain dye compounds included within the scope of our invention.

*Example 3*

17.3 grams of 1-amino-2-chloro-4-nitrobenzene are diazotized and the diazonium compound obtained is coupled with 22.1 grams of

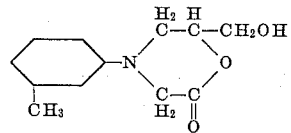

Coupling and recovery of the dye compound formed may be carried out as described in Example 1. The dye compound obtained colors cellulose acetate silk a rubine shade.

By the substitution of an equivalent gram molecular weight of

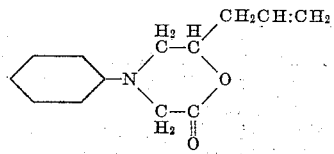

and

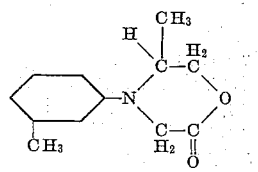

for example, for the coupling component of this example, further dye compounds included within the scope of our invention can be obtained.

*Example 4*

21.7 grams of 1-amino-2-bromo-4-nitrobenzene are diazotized in known fashion and the diazonium compound obtained is coupled with 26.3 grams of

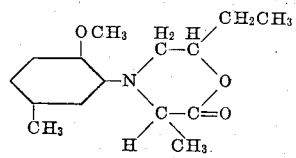

Coupling and recovery of the dye compound formed may be carried out as described in Example 1. The dye compound obtained colors cellulose acetate silk a rubine shade.

By the substitution of an equivalent gram molecular weight of

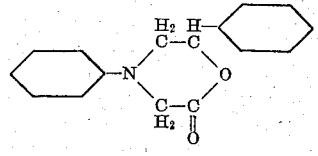

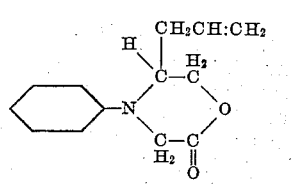

and

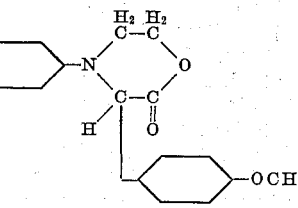

for example, for the coupling component of this example, other dye compounds included within the scope of our invention can be obtained.

Example 5

15.4 grams of 1-amino-2-hydroxy-4-nitrobenzene are diazotized in known fashion and the diazonium compound obtained is coupled with 30.1 grams of

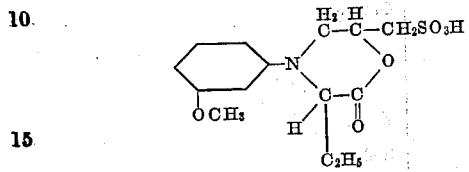

The dye compound obtained colors cellulose acetate silk a pinkish-red shade. After coupling, for example, in accordance with the method described in Example 1, any desired salt such as the sodium, potassium or ammonium salt may be prepared in accordance with known methods after which the dye is salted out, filtered and dried.

Example 6

19.7 grams of p-aminoazobenzene are diazotized in known fashion and the diazonium compound obtained is coupled with 20.7 grams of

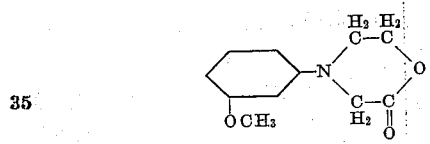

Coupling may be carried out as described in Example 1 and requires about 4 to 6 hours. The dye compound obtained colors cellulose acetate silk a red shade.

Example 7

18.3 grams of 1-amino-2,4-dinitrobenzene are diazotized in known fashion and the diazonium compound obtained is coupled with .1 gram mole of

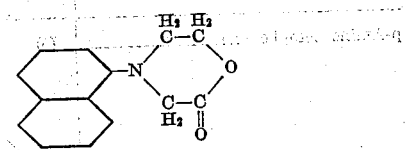

The dye compound obtained colors cellulose acetate silk a violet shade.

By the substitution of an equivalent molecular weight of

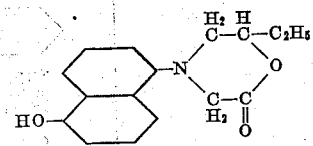

and

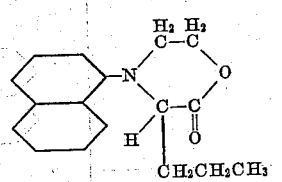

for example, for the coupling component of this example, additional dye compounds included within the scope of our invention can be obtained.

The following tabulation further illustrates the compounds of our invention together with the color they produce on cellulose acetate silk. The compounds indicated below may be prepared by diazotizing the amines listed under the heading "Amine" and coupling the diazonium compounds formed with the compounds specified in the column entitled "Coupling component." The diazotization and coupling reactions may, for example, be carried out following the general procedure described in Examples 1 to 7, inclusive.

| Amine | Coupling component | Color on cellulose acetate silk |
|---|---|---|
| p-Aminoacetophenone | (1) [morpholine with cyclohexyl N-substituent] | Orange. |
| Do | (2) [morpholine with phenyl N and C₃H₇ substituent] | Do. |
| Do | (3) [morpholine with dimethoxyphenyl N-substituent and cyclobutyl (C₄H₇)] | Do. |
| Do | (4) [morpholine with methoxy-chlorophenyl N and CH₂CH:CH₂ substituent] | Do. |

| Amine | Coupling component | Color on cellulose acetate silk |
|---|---|---|
| p-Aminoacetophenone | (5) [structure: N-cyclohexyl (with CH₃) morpholinone-type ring] | Orange. |
| Do | (6) [structure: N-cyclohexyl with OCH₃ and NHCOCH₃ substituents, morpholinone ring] | Red. |
| Do | (7) [structure: N-decahydronaphthyl morpholinone with CH₃] | Do. |
| Do | (8) [structure: N-(hydroxy-decahydronaphthyl) morpholinone with CH₂CH:CH₂ group] | Rubine. |
| Do | (9) [structure: N-decahydronaphthyl morpholinone with C₆H₁₁ (cyclohexyl) group] | Red. |
| Do | (10) [structure: N-decahydronaphthyl morpholinone with CH₂-(chlorocyclohexyl) group] | Do. |
| Do | (11) [structure: N-decahydronaphthyl morpholinone] | Do. |
| p-Nitroaniline | Coupling components 1–11 | Red to blue. |
| 1-amino-2-methyl-4-nitrobenzene | do | Red to reddish-blue. |
| 1-amino-2-methoxy-4-nitrobenzene | do | Red to blue. |
| 1-amino-2-(Cl, Br, I, F)-4-nitrobenzene | do | Do. |
| 1-amino-2,5-dichloro-4-nitrobenzene | do | Pink-red to blue. |
| 1-amino-2-hydroxy-4-nitrobenzene | do | Do. |
| p-Aminoazobenzene | do | Orange-red to reddish-blue. |
| 1-amino-2,4-dinitrobenzene | do | Rubine to blue. |
| 1-amino-2,4-dinitro-6-chloro-benzene | do | Rubine to blue. |
| 1-amino-2,4-dinitro-6-bromo-benzene | do | Rubine to blue-green. |
| 1-amino-2,4,6-trinitrobenzene | do | Do. |
| 2-amino-benzothiazole [structure] | do | Rubine to green. |
|  |  | Orange to purple. |
| 2-amino-6-methoxy-benzothiazole | do | Orange-red to reddish-blue. |
| 2-amino-6-chloro-benzothiazole | do | Orange to reddish-blue. |

In order that the preparation of the azo compounds of our invention may be clearly understood, the preparation of the coupling components employed in their manufacture is indicated hereinafter. The preparation of the coupling component having the formula:

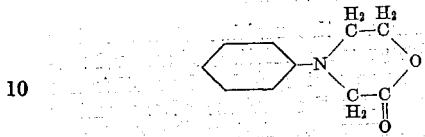

is described in Ukrainskii Khemichnii Zhurnal 4 Sci. Pt. 231–40 (1929) (see Chem. Abstracts, vol. 24, page 1084). Using the methods described in this article, we may prepare any of the coupling components employed in the preparation of the azo compounds of our invention.

The coupling components employed in the preparation of the azo compounds of our invention may also be prepared by reacting a compound having the formula:

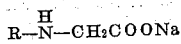

wherein R represents an aryl nucleus of the benzene series or an aryl nucleus of the naphthalene series with an alkylene oxide, such as ethylene oxide, propylene oxide and trimethylene oxide, to replace the hydrogen atom attached to the nitrogen atom with a hydroxyalkyl group. The compound thus obtained is then converted to its free acid form by treatment with a suitable acid, such as hydrochloric acid, following which the lactone can be obtained by heating.

The preparation of the coupling components employed by us will be illustrated by the following example:

*Example A*

187 grams of meta-tolylglycine sodium salt are placed in an autoclave with 46 grams of ethylene oxide and the reaction mixture is heated at 160–190° C. for 4 to 6 hours. The resulting product is then placed in water and treated with hydrochloric acid until the mixture just turns Congo red paper blue. The resulting

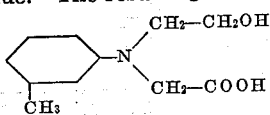

is then distilled to obtain the lactone having the formula:

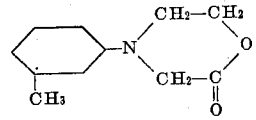

From the foregoing, it is believed that the preparation of the coupling components employed in the manufacture of the compounds of our invention will be apparent to one skilled in the art.

The azo dye compounds of our invention are, for the most part, relatively insoluble in water. Those compounds which are insoluble in water may be advantageously employed for the direct dyeing of textile materials by grinding the dye to a fine powder, intimately mixing it with a suitable dispersing or solubilizing agent, and adding the resulting mixture to water or a dilute solution of soap in water to form an aqueous dyebath. Following this known preparation of the dyebath, the textile materials to be dyed may be added to the dyebath and the dyeing operation conducted in known fashion. The dye compounds of our invention which are water soluble do not, of course, require the use of a dispersing or solubilizing agent but may be applied to silk, wool and (depending upon the nature and position of the water-solubilizing group) organic derivatives of cellulose textile materials from an aqueous solution of the dye which may contain salt. For a more complete description as to how the azo dye compounds of our invention may be employed in dyeing or coloring operations, reference may be had to our U. S. Letters Patent No. 2,115,030, issued April 26, 1938. For a more detailed description as to how the water soluble azo dyes of our invention may be employed for the coloration of textile materials made of or containing organic derivatives of cellulose, silk and wool or mixtures of these, reference may be had to our U. S. Letters Patent No. 2,107,898, issued February 8, 1938.

We claim:

1. The azo compounds having the general formula:

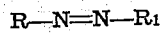

wherein R represents the residue of a member selected from the group consisting of an aryl nucleus of the benzene series and a benzothiazole nucleus, R₁ represents the residue of a member selected from the group consisting of a 4-phenol morpholone-(2) and a 4-naphthyl-morpholone-(2) nucleus.

2. The azo compounds having the general formula:

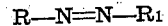

wherein R represents the residue of an aryl nucleus of the benzene series, R₁ represents the residue of a 4-phenyl morpholone-(2) nucleus.

3. The azo compounds having the general formula:

wherein R represents the residue of an aryl nucleus of the benzene series containing but one benzene ring which has a nitro group in the para position to the azo bond, R₁ represents the residue of a 4-phenyl morpholone-(2) nucleus.

4. The azo compounds having the general formula:

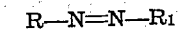

wherein R represents the residue of a member selected from the group consisting of an aryl nucleus of the benzene series and a benzothiazole nucleus, R₁ represents the residue of a member selected from the group consisting of an aryl nucleus of the benzene series containing but one benzene ring and an aryl nucleus of the naphthalene series and wherein the nucleus R₁ contains in para position to the azo bond a

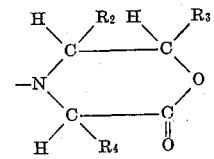

group wherein R₂, R₃ and R₄ each represents a member selected from the group consisting of hydrogen, an alkyl group, an aryl nucleus of the benzene series containing but one benzene ring, a cycloalkyl group and an allyl group.

5. The azo compounds having the general formula:

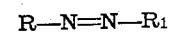

wherein R represents the residue of an aryl nucleus of the benzene series, R₁ represents the residue of an aryl nucleus of the benzene series containing but one benzene ring and wherein the nucleus $R_1$ contains in para position to the azo bond a

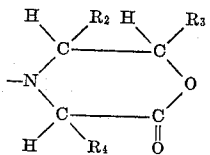

group wherein $R_2$, $R_3$ and $R_4$ each represents a member selected from the group consisting of hydrogen, an alkyl group, an aryl nucleus of the benzene series containing but one benzene ring, a cycloalkyl group and an allyl group.

6. The azo compounds having the general formula:

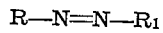

wherein R represents the residue of an aryl nucleus of the benzene series, $R_1$ represents the residue of an aryl nucleus of the benzene series containing but one benzene ring and wherein the nucleus $R_1$ contains in para position to the azo bond a

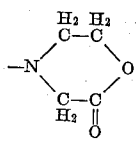

group.

7. Material made of or containing an organic derivative of cellulose colored with a nuclear non-sulfonated azo dye compound having the general formula:

wherein R represents the residue of a member selected from the group consisting of an aryl nucleus of the benzene series and a benzothiazole nucleus, $R_1$ represents the residue of a member selected from the group consisting of a 4-phenyl morpholone-(2) and a 4-naphthyl morpholone-(2) nucleus.

8. Material made of or containing an organic derivative of cellulose colored with a nuclear non-sulfonated azo dye compound having the general formula:

wherein R represents the residue of an aryl nucleus of the benzene series, $R_1$ represents the residue of a 4-phenyl morpholone-(2) nucleus.

9. A cellulose acetate colored with a nuclear non-sulfonated azo dye compound having the general formula:

wherein R represents the residue of a member selected from the group consisting of an aryl nucleus of the benzene series and a benzothiazole nucleus, $R_1$ represents the residue of a member selected from the group consisting of a 4-phenyl morpholone-(2) and a 4-naphthyl morpholone-(2) nucleus.

10. A cellulose acetate colored with a nuclear non-sulfonated azo dye compound having the general formula:

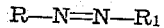

wherein R represents the residue of an aryl nucleus of the benzene series, $R_1$ represents the residue of a 4-phenyl morpholone-(2) nucleus.

11. A cellulose acetate colored with a nuclear non-sulfonated azo dye compound having the general formula:

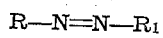

wherein R represents the residue of an aryl nucleus of the benzene series containing but one benzene ring which has a nitro group in the para position to the azo bond, $R_1$ represents the residue of a 4-phenyl morpholone-(2) nucleus.

12. A cellulose acetate colored with a nuclear non-sulfonated azo dye compound having the general formula:

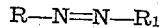

wherein R represents the residue of an aryl nucleus of the benzene series, $R_1$ represents the residue of an aryl nucleus of the benzene series containing but one benzene ring and wherein the nucleus $R_1$ contains in para position to the azo bond a

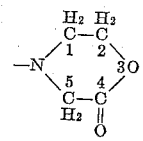

group.

JAMES G. McNALLY.
JOSEPH B. DICKEY.